(12) United States Patent
Stille

(10) Patent No.: US 8,155,626 B2
(45) Date of Patent: Apr. 10, 2012

(54) METHOD AND APPARATUS FOR MULTIMEDIA COMMUNICATION

(75) Inventor: Mats Stille, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 343 days.

(21) Appl. No.: 11/576,334

(22) PCT Filed: Jan. 26, 2005

(86) PCT No.: PCT/SE2005/000091
§ 371 (c)(1),
(2), (4) Date: Jul. 17, 2008

(87) PCT Pub. No.: WO2006/038839
PCT Pub. Date: Apr. 13, 2006

(65) Prior Publication Data
US 2008/0304438 A1 Dec. 11, 2008

(30) Foreign Application Priority Data
Oct. 1, 2004 (SE) .................................. 0402384-2

(51) Int. Cl.
  *H04M 1/725* (2006.01)
  *H04M 3/42* (2006.01)
  *H04M 7/00* (2006.01)
  *H04L 12/66* (2006.01)
(52) U.S. Cl. .................. 455/412.2; 455/414.1; 455/415; 455/417; 379/221.01; 370/352

(58) Field of Classification Search ............... 455/414.1, 455/415, 412.1, 412.2, 417, 445; 379/221.01; 370/352
See application file for complete search history.

(56) References Cited

U.S. PATENT DOCUMENTS

| | | | |
|---|---|---|---|
| 6,810,243 B2 * | 10/2004 | Torabi | 455/417 |
| 7,366,183 B1 * | 4/2008 | Sylvain | 370/395.61 |
| 7,466,812 B1 * | 12/2008 | Mahy et al. | 379/202.01 |
| 2003/0236892 A1 | 12/2003 | Coulombe | |
| 2004/0015589 A1 | 1/2004 | Isozu | |
| 2004/0120498 A1 * | 6/2004 | Sylvain | 379/221.01 |
| 2004/0156394 A1 * | 8/2004 | Westman | 370/471 |
| 2004/0250252 A1 * | 12/2004 | Khartabil | 719/310 |
| 2005/0113062 A1 * | 5/2005 | Pelaez et al. | 455/405 |

FOREIGN PATENT DOCUMENTS

| | | |
|---|---|---|
| JP | H05-252313 | 9/1993 |
| JP | H07-264378 | 10/1995 |
| JP | 2000-184414 | 6/2000 |
| WO | WO 2005/055556 | 6/2005 |

* cited by examiner

*Primary Examiner* — Un C Cho

(57) ABSTRACT

A method and apparatus for enabling communication of IP multimedia content to a called user during a circuit-switched call between a calling terminal (A) having called a primary communication unit (B1), when the call has been forwarded to a secondary communication unit (B2). The calling terminal receives a connected number during a call set-up procedure, e.g. by subscribing to a called line presentation (COLP) service. The calling terminal stores the received connected number and determines multimedia capabilities of the secondary communication unit based on the connected number. Available multimedia options can then be determined based on the multimedia capabilities of the secondary communication unit.

15 Claims, 3 Drawing Sheets

METHOD AND APPARATUS FOR MULTIMEDIA COMMUNICATION

TECHNICAL FIELD

The present invention relates generally to a method and apparatus for communicating multimedia over an IP communication network during a circuit-switched call. In particular, the invention enables multimedia communication when a called terminal is subject to call-forwarding to another communication unit.

BACKGROUND OF THE INVENTION AND PRIOR ART

Until recently, wireless mobile terminals have been used basically for making voice calls. Standardised and well-established communication technologies and protocols are then utilised to communicate voice between fixed and/or mobile terminals using circuit-switched communication channels.

However, a multitude of new telephony services involving "multimedia" are now rapidly being developed, enabled by the introduction of new technologies allowing for notably higher transmission rates and increased network capacity. For example, GPRS (General Packet Radio Service) and WCDMA (Wideband Code Division Multiple Access) technologies are currently emerging for enabling wireless telephony services requiring a wide range of transmission rates and different protocols and media formats.

The trend today is also a move towards packet-switched networks and technologies providing more capacity and flexibility as compared to the traditional circuit-switched networks. Further, new sophisticated mobile terminals are also emerging on the market, equipped with functionality to handle the new services, including high resolution colour displays and various codecs (coders/decoders) e.g. for visual information.

Multimedia services typically involve transmission of data representing text, documents, images, audio files and video files in a multitude of formats and combinations, and according to various different protocols. The term "multimedia" will be used in this description as generally referring to telephony services involving the transfer of any choice of media, typically with visual content, apart from ordinary voice, over a packet-switched network.

A prevailing goal or ambition in the field of telecommunication is to converge all services on to a single transport mechanism—the packet based Internet Protocol (IP), regardless of the type of access networks and technologies involved. A network architecture called "IP Multimedia Subsystem" (IMS) has therefore been developed by the $3^{rd}$ Generation Partnership Project (3GPP) as an open standard, to give operators of access networks the ability to offer multimedia services in the packet domain. IMS is a platform for enabling services based on IP transport, involving the communication of multimedia content from one terminal to another over an IP network. IMS is more or less independent of the access technology used, and is basically not restricted to any limited set of specific services.

When using multimedia services, the prerequisites for a specific session will vary depending on the invoked service and the capabilities of the calling and called terminals, respectively, as well as on other factors. During a session, certain session parameters defining the rules of communication must be used by both the calling and called terminals in order to communicate the desired information. Such session parameters are related to codecs and storage means available in each terminal, as well as applications and signalling protocols.

Since many different types of terminals are available on the consumer market, two terminals about to communicate multimedia will most likely have different capabilities in some respect, and each terminal has typically no knowledge of the capabilities of the other. In order to establish an IP multimedia session, session parameters must therefore first be selected and established in a session set-up procedure, which is a kind of negotiation between the two terminals.

Thus, the terminals must exchange information regarding their specific capabilities and preferences, in order to agree on which session parameters to use during a forthcoming IP multimedia session, hereafter referred to as "capability exchange" for short. A specification for session set-up has been defined called "SIP" (Session Initiation Protocol, according to the standard IETF RFC 3261 et al). SIP is an application-layer control (signalling) protocol for creating, modifying and terminating sessions over a packet-switched network. The SIP standard is used by the above-mentioned IMS system to establish and control IP multimedia communications.

In the SIP protocol, a method called "INVITE" is defined when terminals about to communicate multimedia basically exchange their capabilities during the multimedia session set-up procedure. In this method, a calling terminal sends a session invitation message called "SIP INVITE" to a called terminal including its own capabilities, which then responds by sending over its capabilities to the calling terminal. In this way, both terminals will become aware of each other's capabilities, and can determine accordingly which applications and codecs that can be used in the forthcoming session.

Another method called "OPTIONS" is also specified in the SIP protocol allowing a terminal to query another terminal as to its capabilities regarding codecs and supported applications, without the user actually "calling" the other party. However, the user must of course first enter the telephone number of the other terminal. According to this method, the terminal then sends a capability query called "SIP OPTIONS" to the other terminal, preferably including its own capabilities, which responds by sending over its capabilities to the querying terminal. A "SIP OPTIONS update" message can also be sent if the capabilities are changed at a later stage.

The OPTIONS method can also be used during an ongoing voice call for enriching the call with multimedia communication. By way of example, a user may wish to send an image, a document, a video clip or audio clip, to the other user during an ongoing voice call, in order to discuss it at the same time. After exchanging their capabilities, the terminals may further indicate the optional multimedia available to its users, e.g. by displaying available services and/or applications as icons or the like on a terminal screen. A user can then easily select which type of service and media to use in a forthcoming session with the other party.

When the user presses a key or the equivalent on his/her terminal for submitting some selected content, the terminal first sends a session invitation message, inviting the other terminal to execute an IP multimedia session involving the transfer of the selected content, before submitting the actual content. The session invitation contains a description of the selected content/media, typically including information on the activated application as well as the coded format (e.g. jpeg, gif or 3gp) and data size (e.g. 50 Kbytes) of the selected content, thereby indicating what codec, application and storage capacity are required to receive the content. If the SIP standard is used in this procedure, the session invitation is the above-mentioned SIP INVITE message. Thus, the session invitation effectively queries the terminal if it is capable of receiving the selected content.

In PCT/SE03/01901, a solution is disclosed where the capability exchange procedure can be bypassed by storing (or "caching") in each terminal the capabilities of the other terminal after a first multimedia session. When a second session is to be conducted between the same two terminals at a later occasion, the stored capabilities can be retrieved and used, merely by recognising the opposite terminal, in order to save time and signalling.

Hence, the terminal of a calling user can normally use any of the above-described methods to determine the capabilities of the terminal of a called user, in order to execute a multimedia session between the two terminals. However, the called user may have activated a call-forwarding service, meaning that any calls directed to a called primary communication unit are routed to a secondary communication unit instead, as selected by the called user. The re-routing of circuit-switched calls upon call-forwarding is generally handled by a service node or "core" in the home network of the called unit, which is a well-known procedure and therefore not necessary to described here further.

In different implementations of the call-forwarding service, the secondary communication unit may be a voice mail apparatus in which a spoken message or the like from the first user can be recorded and stored for later retrieval, or another terminal at which the called user, or another appointed person, can be reached. Calls may be forwarded in this way e.g. upon busy, no reply or immediate condition. Moreover, a call filtering function may be used where some specific callers will be forwarded and others will not. For example, all internal calls to a terminal within a private enterprise network may be directly connected, whereas all external calls to that terminal may be forwarded to a secretary's telephone or a voice mail apparatus.

A user calling another user by dialling the telephone number of a primary communication unit may wish to convey some multimedia content during the call to the called user, such as an image or a video or audio clip, even if the call has been forwarded to a secondary communication unit, such as another terminal or a voice mail apparatus.

However, it is currently not possible to send multimedia content to the secondary communication unit after calling the number of the primary communication unit, since there is no mechanism available to execute the above-described necessary capability exchange with a forwarded-to secondary communication unit. Any messages in current capability exchange procedures for multimedia, such as the above-mentioned SIP OPTIONS and SIP INVITE messages, are exclusively directed to the called telephone number, i.e. the number of the primary communication unit. Therefore, no capabilities can be exchanged with the secondary communication unit. The calling terminal (and its user) may not even be aware that the call has been forwarded.

Thus, when a call-forwarding service has been activated, the desired content cannot be conveyed to the secondary communication unit unless the calling user can make a new call directly thereto. This is a serious drawback, not least because the calling user is normally not aware of the fact that the call has been forwarded to another terminal than the one called. Moreover, it is typically not possible to call a voice mail apparatus directly.

These shortcomings will of course be perceived as a problem by terminal users not being able to convey IP multimedia content subject to call-forwarding, as well as by the network operators concerned being deprived of potential revenue from multimedia traffic. Hence, it is desirable to overcome the problem of conveying multimedia content during an ongoing call to a user currently utilising a call-forwarding service. It is also desirable to determine which multimedia options are available in communication with a terminal or voice mail apparatus to which calls are forwarded.

SUMMARY OF THE INVENTION

It is an object of the present invention to enable communication of IP multimedia content to a called user from a calling terminal when the call is subject to call-forwarding. It is another object of the present invention to provide a solution for determining the capabilities of the secondary communication unit, to enable indication of available multimedia options at the calling terminal, e.g. by displaying available services and/or applications as icons or the like on screen.

These objects and others are obtained by providing a method of enabling communication of IP multimedia content to a called user from a calling terminal having called a primary communication unit, when the call has been forwarded to a secondary communication unit and a connected number is received during a call set-up procedure. The calling terminal stores the received connected number and determines multimedia capabilities of the secondary communication unit based on the connected number. Available multimedia options can then be determined based on the determined multimedia capabilities of the secondary communication unit.

The connected number may be received as the calling terminal subscribes to a connected line presentation (COLP) service. The secondary communication unit may be a communication terminal or a voice mail apparatus.

The multimedia capabilities of the secondary communication unit may be determined by requesting capabilities from the secondary unit based on the stored connected number. Capabilities are then preferably requested from the secondary unit by sending a capability query (e.g. SIP OPTIONS) or a session invitation (e.g. SIP INVITE), using the stored connected number as the destination address.

Alternatively, the multimedia capabilities of the secondary communication unit may be determined by retrieving cached capabilities of the secondary unit based on the stored connected number. The cached capabilities are then preferably retrieved by using the connected number as a key.

The present invention also refers to a communication terminal capable of multimedia communication and of receiving a connected number during a call set-up procedure when calling a primary communication unit and the call has been forwarded to a secondary communication unit. The terminal includes means for storing the received connected number and means for determining multimedia capabilities of the secondary communication unit based on the connected number. The terminal is preferably adapted to determine available multimedia options based on the determined multimedia capabilities of the secondary communication unit.

The terminal may be adapted to receive the connected number by means of subscription to a connected line presentation (COLP) service.

The terminal may be adapted to determine the multimedia capabilities of the secondary communication unit by requesting capabilities from the secondary unit based on the stored connected number. In that case, the terminal may be further adapted to request capabilities from the secondary unit by sending a capability query (e.g. SIP OPTIONS) or a session invitation (e.g. SIP INVITE), using the stored connected number as the destination address.

The terminal may also be adapted to alternatively determine the multimedia capabilities of the secondary communication unit by retrieving cached capabilities of the secondary unit based on the stored connected number. The terminal may then be further adapted to retrieve the cached capabilities by using the connected number as a key.

Further features and benefits of the present invention will be apparent from the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Figure 1:
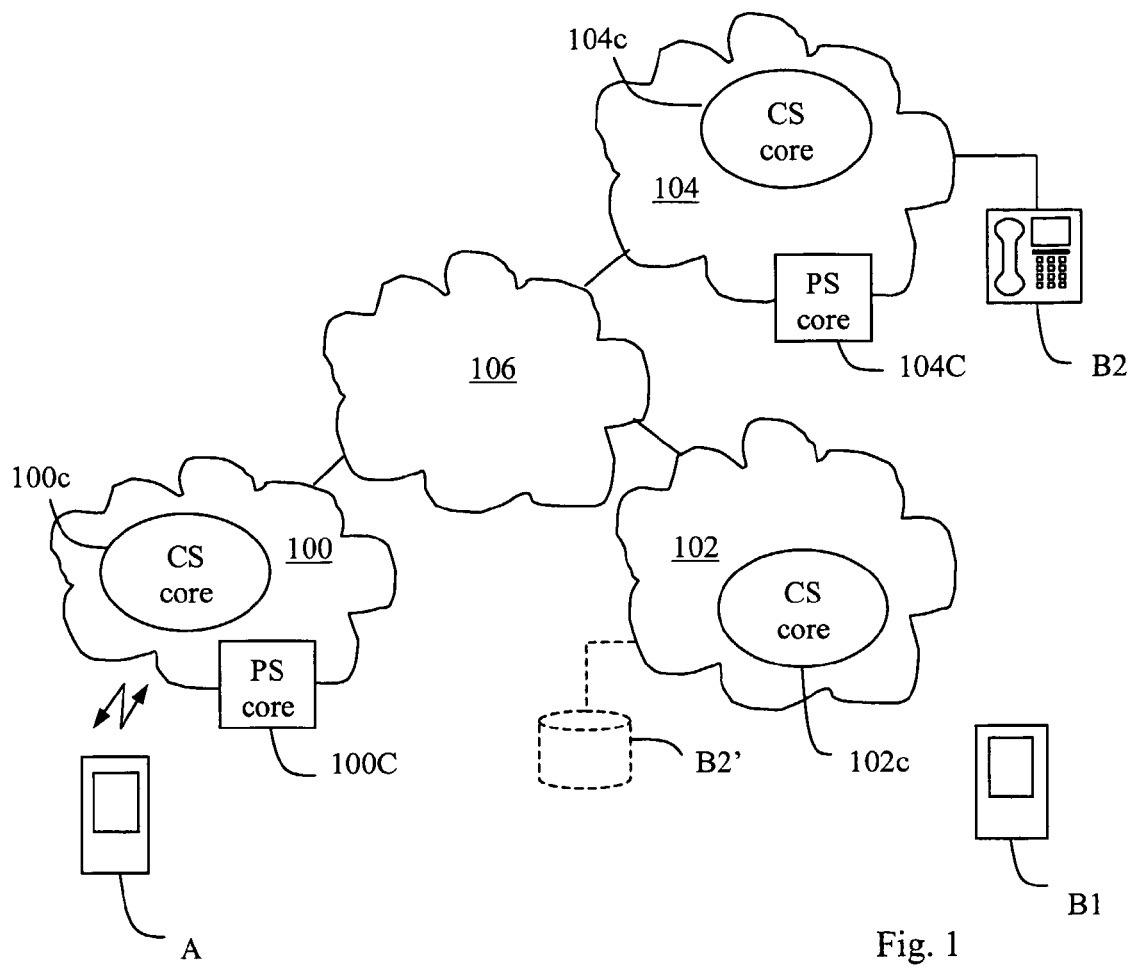
FIG. 1 is a schematic view of a communication scenario where the present invention may be used.

FIG. 1 illustrates schematically an exemplary basic communication scenario where the present solution may be used, when a communication terminal A directs a circuit-switched call to another communication terminal B1 being subject to call-forwarding. In this case, terminal A is a mobile terminal currently in radio connection with a first access network 100.

Thus, the user of terminal B1 has activated a call-forwarding service to direct incoming calls to another communication terminal B2 different from terminal B1, whenever a predefined call-forwarding condition is fulfilled. The shown terminals A, B1 and B2 may be any types of communication units and the present invention is not limited in this respect. In the following description, the originally called terminal B1 will be generally referred to as the "primary communication unit" and the forwarded-to terminal B2 will be generally referred to as the "secondary communication unit".

The called primary unit B1 is registered with a second "home" network 102 comprising a service core adapted to handle circuit-switched (CS) communication and services, schematically illustrated as CS core 102c. In particular, CS core 102c will forward any calls aimed at primary unit B1 to the secondary unit B2. In this context, it is of no significance whether the called primary unit B1 is currently in connection with any access network or not. Alternatively, the secondary unit to which incoming calls are forwarded may be a voice mail apparatus B2' in the home network 102 of primary unit B1. Recording and storing voice mail messages is a basic network service particularly for mobile terminal subscriptions. In this example however, the secondary unit B2 is illustrated as a fixed telephone connected to a third access network 104.

The networks 100, 102 and 104 are typically interconnected by means of a generic "backbone" network 106, which in practice may be any type of communication network, or combination of different networks. It is assumed that terminals A, B1, B2 and networks 100-106 are capable of using any required well-established communication techniques, and these are not necessary to describe further to understand the present invention. At least access networks 100 and 104 further include service cores adapted to handle packet-switched (PS) multimedia sessions and services, e.g. according to the above-described IMS system, schematically illustrated in the figure as PS cores 100C and 104C, respectively. Access networks 100 and 104 also include corresponding CS cores 100c and 104c, respectively.

By way of example, typical call-forwarding conditions may be that incoming calls are forwarded if primary unit B1 is busy in another call, or that the call is for some reason not answered within a predefined time-out period. The primary unit B1 may not be connected to any access network, e.g. not powered-on or out of radio coverage in the case of a mobile terminal. Another type of call-forwarding condition is an immediate condition, such that incoming calls are forwarded immediately regardless of the current availability or status of primary unit B1. Further, various call filtering functions may also be applied dependent on the identity of the calling party. However, the present invention and the embodiments described below are not limited to any specific call-forwarding conditions.

After a circuit-switched call has been established between terminal A and secondary unit B2, the calling user at A may wish to communicate multimedia content with the other user at B2 during the ongoing voice call, e.g. by sending an image, a document, a video clip or audio clip. Alternatively, the calling user may simply wish to investigate which multimedia options are available with respect to the capabilities of the other user's terminal, before deciding to send anything. It is likely that the terminals A and B2 have different capabilities with respect to codecs, applications and/or memory storage size, and their capabilities must therefore be exchanged first to determine these factors, as discussed above.

Figure 2:
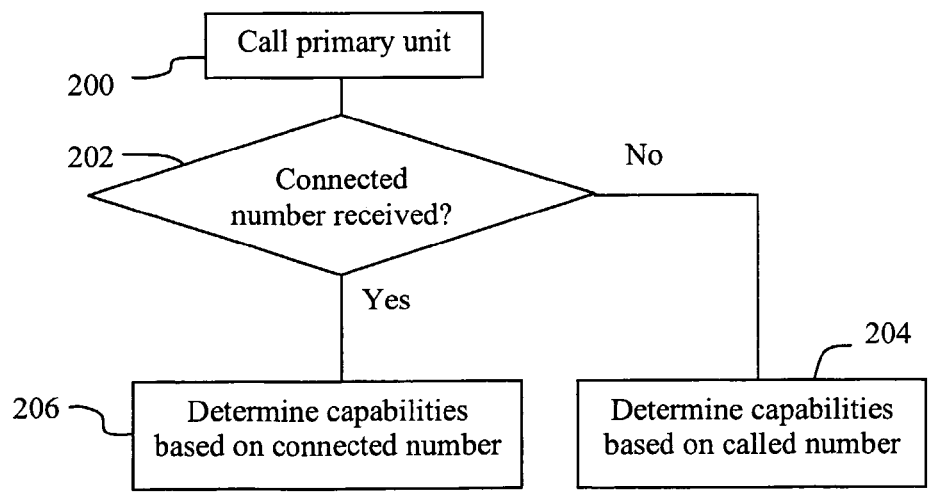
FIG. 2 is a flow chart illustrating a basic procedure for determining capabilities, in accordance with one embodiment.

As mentioned above, there is currently no mechanism for performing the required capability exchange with a communication unit being subject to call-forwarding since existing conventional routines are based on a called number, i.e. the number of B1 and not B2 in this case. However, the present invention provides a solution to this problem. FIG. 2 is a flow chart illustrating a basic procedure, according to one embodiment, of how a calling terminal can determine capabilities of a communication unit to which a call has been forwarded. FIG. 2 will now be described with further reference to the scenario in FIG. 1.

In a first step 200, a user of terminal A has entered the telephone number of primary unit B1, and a call is directed thereto in a call set-up procedure. In order to enable multimedia communication during the call, terminal A must then determine the capabilities of the opposite communication unit. Many existing networks of today provide a service of displaying a connected number on a terminal screen to the user, typically referred to as "Connected Line Presentation, COLP", by sending the connected number to the calling terminal. If no such service is provided, this number can be obtained anyhow, which will be described in more detail later below.

In the basic procedure of FIG. 2, it is determined in a next step 202 whether terminal A has received a connected number during the call set-up. If not, the calling terminal A will attempt to determine the capabilities of the opposite unit based on the called number in a following step 204, e.g. by means of a conventional capability query or exchange. The determined capabilities can then be used for multimedia communication if the call has not been forwarded. Otherwise, terminal A will try to determine the capabilities of the "wrong" unit, i.e. unit B1, instead of the forwarded-to unit B2, in step 204.

However, if it is determined in step 202 that a connected number has been received, terminal A determines the capabilities based on the connected number instead of the originally called number, in a following step 206. If the received connected number is different from the called number, the call has probably been forwarded to another terminal or unit, in this case to secondary unit B2, by means of a conventional call-forwarding procedure. In that case, terminal A effectively determines the capabilities of the secondary unit B2 in step 206. On the other hand, if the connected number is the same as the called number, the call has not been forwarded and terminal A consequently determines the capabilities of primary unit B1 in step 206. Hence, by using the connected number when available, it is not necessary for the calling terminal A to "know" whether the call has actually been forwarded or not. Capabilities will be determined for the correct unit in step 206 in either case.

In different alternatives at step 206 or step 204, capabilities can be obtained by request in connection with either a multimedia session set-up (e.g. by sending a SIP INVITE) or a capability query (e.g. by sending a SIP OPTIONS), according to conventional procedures. Thus, the present invention is not limited in this respect. It should be noted that any capability queries or requests are transferred over a packet-switched part of the networks and would therefore not be subjected to the CS implemented call-forwarding service, if activated, when addressed to the primary unit B1. Any capability request must therefore be addressed directly to the secondary unit B2.

Figure 3:
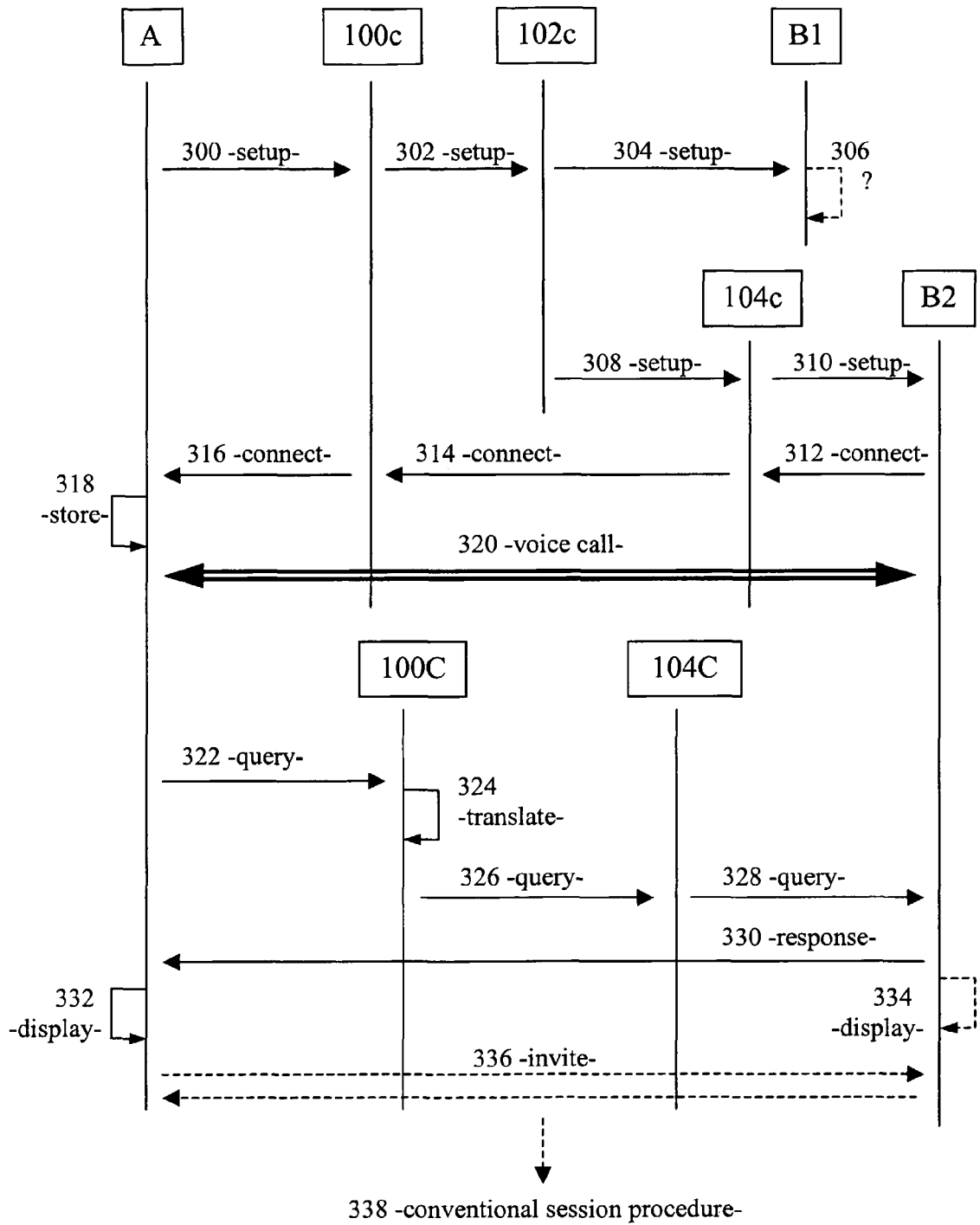
FIG. 3 is a signalling diagram illustrating an exemplary procedure for exchanging capabilities, in accordance with the present invention.

With reference to a signalling diagram in FIG. 3, a more detailed exemplary procedure will now be described for determining capabilities of a communication unit when subject to call-forwarding, again with further reference to FIG. 1. The procedure starts with the user of terminal A entering the number of primary unit B1 in order to make an ordinary circuit-switched voice call to the user of B1. In response thereto, a conventional call set-up request is first sent from terminal A to the CS core 100c of the access network 100 to which terminal A is connected, in a first step 300.

In a next step 302, the set-up request is conveyed to the CS core 102c in the home network 102 to which primary unit B1 belongs, based on the called number. If the service of displaying the connected number is used, e.g. COLP, a request for the connected number is indicated in the set-up request sent in step 302, typically as a COLP indication.

In response to the set-up request, the receiving CS core 102c may then send a conventional call set-up message in a step 304 towards the called primary unit B1. If unit B1 is a mobile terminal, this would typically involve a conventional paging routine in order to locate the terminal. The next step 306 schematically illustrates that the called unit B1 does not respond, e.g. due to being busy, not connected, or simply not answered. Alternatively, CS core 102c may detect that the call is to be forwarded as an immediate condition when checking the incoming number of B1, and then steps 304 and 306 would not be executed. Thus, the execution of steps 304 and 306 will depend on the forwarding condition defined for B1, which however is not significant for the present invention.

Generally speaking, CS core 102c has now somehow detected that the call is to be forwarded to secondary unit B2, when receiving the set-up request in step 302. Therefore, as a response thereto in a next step 308, the CS core 102c sends a new set-up request to the CS core 104c, which is similar to the one received in step 302 although based on the received number of the secondary unit B2. In the case if unit B2 is a mobile terminal, the set-up request would again be sent to a corresponding CS core in the home network of the mobile terminal, and the terminal would be located using a paging routine. In this example, however, unit B2 is illustrated as a fixed telephone.

The set-up request of step 308 includes the connected number request if received from CS core 100c in the previous set-up request of step 302. In a possible development of the present solution, CS core 102c may add a connected number request to the set-up request of step 308, if not received from CS core 100c, or the CS core 104c in network 104 of B2 may later provide the connected number automatically, without requiring a specific request. However, a COLP subscription is typically required in existing systems to convey the connected number to the calling terminal. As evident from steps 202 and 206 in FIG. 2 above, it is important for the present solution that the number of the secondary unit B2 is somehow obtained at the calling terminal A such that any capability request or query can be addressed correctly.

Similar to step 304, CS core 104c now sends a conventional call set-up message in a step 310 towards the called secondary unit B2. This time, the call is answered and unit B2 responds by sending a conventional connect message in a next step 312 to its CS core 104, which in turn generates a connect message towards A's CS core 100c in a step 314, including the connected number. Finally, a connect message is sent to the calling terminal A in a step 316.

Significantly, the connected number, i.e. the number of the secondary unit B2, is now included in the connect messages of steps 314 and 316, e.g. according to the COLP service. The connected number of B2 has now reached the calling terminal A and may then be displayed on its screen, in accordance with this service. The connected number is typically a so-called E.164 number as defined according to the standard 3GPP TS 24.008 which is generally valid for both fixed and mobile terminals. In the case when the forwarded-to communication unit is a voice mail apparatus, e.g. B2', the connected number may be defined as the E.164 number of the called primary unit B1 plus an added prefix, e.g. 888-0709123456 if the called number is 0709123456.

In preparation of determining the capabilities of unit B2, the calling terminal A now stores the received connected number of unit B2 for later retrieval, in a step 318. An ordinary voice call between A and B2 has now been established by means of call-forwarding, and is conducted as illustrated by a next step 320.

During the voice call, the user of terminal A decides to send some multimedia content to the user (or apparatus) having answered at the secondary unit B2, e.g. an image, a document, a video clip or audio clip. In this example, the user first wants to check which multimedia options are available before sending the content. Alternatively, the user may directly activate a suitable multimedia application in his/her terminal A and select the content from a storage means in the terminal to be conveyed to unit B2. As described above, terminal A must first determine capabilities of the connected unit B2 before any multimedia content can be communicated. In some implementations, a terminal may automatically determine capabilities of the opposite unit, not triggered by any user input, in preparation for multimedia communication.

As described above, determining available multimedia options typically includes sending a capability query, e.g. a SIP OPTIONS message, to the called party, which is packet-switched over the PS core 100C in the access network 100 of the calling terminal A and the corresponding PS core 104C in the access network 104 of the called unit B2. If IMS technology is used for multimedia communication in networks 100 and 104, the PS cores 100C and 104C are typically referred to as "IMS cores".

However, since any capability queries or requests are conventionally directed to the originally called number, another procedure is required when call-forwarding is used. The present solution prescribes that the calling terminal A uses the number obtained in step 316 and stored in step 318 as the connected number, in this case the number of the forwarded-to unit B2, as the destination for sending the capability query to the PS core 100C, in a next step 322. If the call has otherwise not been forwarded, the received connected number would be that of the called unit B1.

PS core 100C must now translate the received number into a valid IP address in order to have it routed by packet-switching to the target unit B2, as indicated in a step 324, since the received connected number is only valid in the CS part of the networks. This number translation can be made using conventional procedures. In particular, in the IMS context and if the connected number is an E.164 number, it is set as "TEL URL" in a Request-URI header of the SIP OPTIONS message. PS core 100C then translates the received TEL URL into a valid SIP URI (Unified Resource Identifier) by means of well-known IETF standards.

In the case if unit B2 is a voice mail apparatus having the above-mentioned exemplary number 888-0709123456, PS core 100C would translate it into, e.g., 0709123456@voicemail45.teliasonera.net, where a voice mail system #45 in a Telia-Sonera network may be designated to handle all 0709-numbers. The receiving voice mail apparatus would then be able to identify the called subscriber by reading the number field prior to the symbol "@".

PS core 100C then conveys the capability query, including the translated number of B2 (e.g. a valid SIP URI), to PS core 104C in a next step 326. Thereafter, the capability query is sent in a step 328 to the secondary unit B2, using the IP address of unit B2 in that network as the destination address, as derived from the connected number translated in step 324. Unit B2 then duly sends a response including the requested capabilities towards the calling terminal A, in a step 330, which in practice is conveyed by means of the intermediate PS cores 104C and 100C, although not specifically shown here. In the IMS context, this response would be a conventional message called "SIP 200 OK/SDP".

After receiving the requested capabilities, terminal A can determine which multimedia options are available with respect to the mutual capabilities of A and B2, and display them on its screen, in a step 332. The user of terminal A is then free to select from the displayed multimedia options and initiate a session with unit B2. Moreover, the opposite unit B2 may likewise display the same available multimedia options on its screen, as indicated in a step 334, since the capabilities of terminal A were typically included in the query conveyed in steps 322-328. Thereafter, either of terminal A and unit B2 may initiate a session starting with a session invitation message as indicated in a step 336, e.g. SIP INVITE. A conventional session procedure will then be executed as indicated in a final step 338, not described here further.

Hence, the present solution includes obtaining the connected number, preferably regardless of whether a COLP service or the equivalent is used or not, storing the connected number, and requesting capabilities from the correct terminal currently in connection, based on the stored connected number. Alternatively, the capabilities of unit B2 may have been cached at terminal A in connection with a previous multimedia session, e.g. as disclosed in PCT/SE03/01901. In that case, the cached capabilities are stored together with a key or the like, which is preferably the telephone number of the corresponding terminal. The cached capabilities can therefore be retrieved if the stored connected number matches that key, and no capability exchange would then be necessary to perform.

Figure 4:
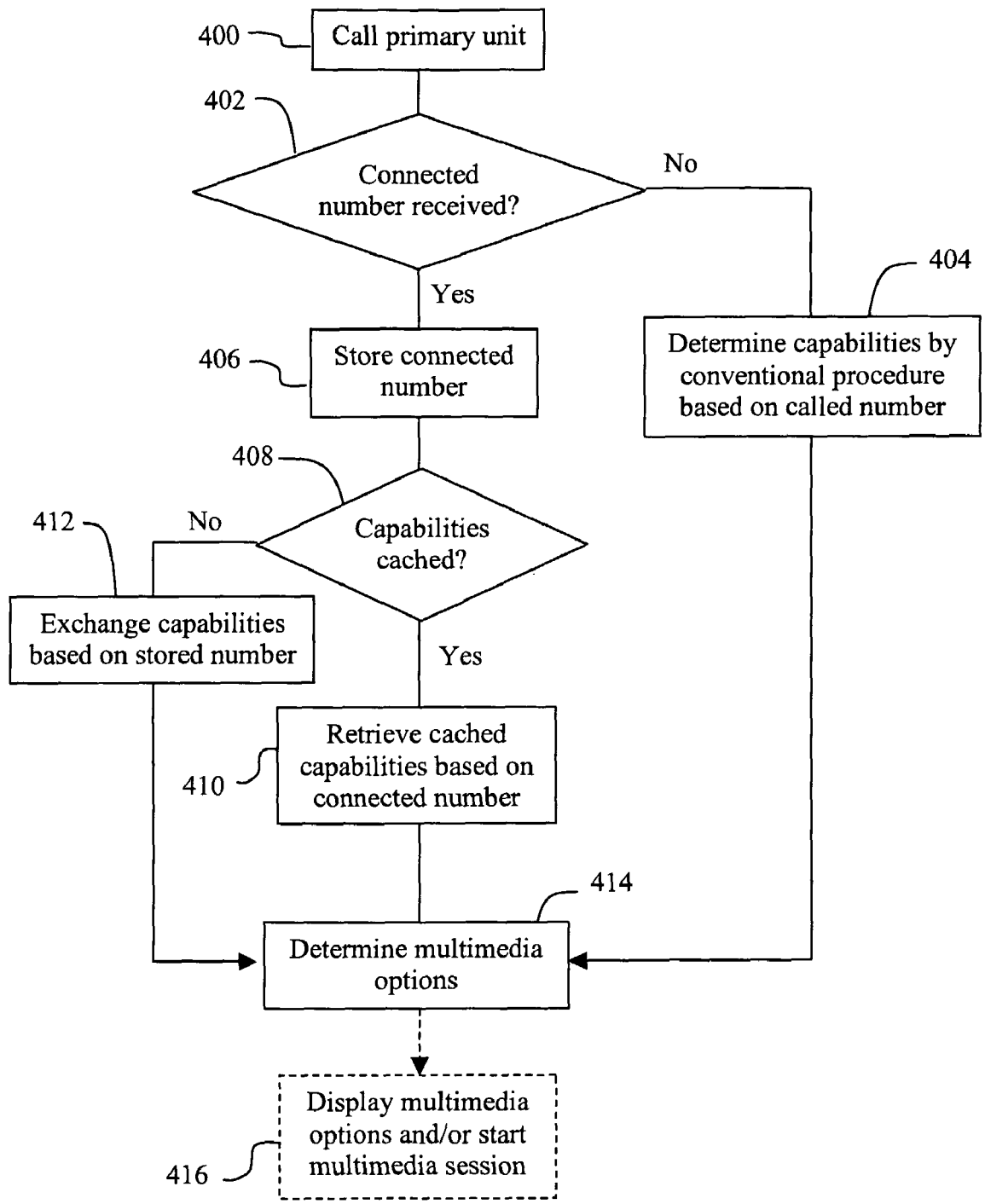
FIG. 4 is a flow chart illustrating an exemplary procedure for determining available multimedia options, in accordance with another embodiment.

FIG. 4 is a flow chart illustrating an exemplary procedure, according to another embodiment, of determining available multimedia options during an ongoing circuit-switched call, in particular with respect to call-forwarding. This procedure is basically executed by the calling terminal and will now be described again with further reference to the scenario in FIG. 1.

In a first step 400, terminal A directs an ordinary circuit-switched voice call to a primary unit B1, just as in step 200 of FIG. 2. The next step 402 of detecting whether a connected number has been received during a call set-up procedure, basically corresponds to step 202 of FIG. 2. If not, the capabilities of the called unit B1 may be determined based on the called number as in any conventional procedure, in a following step 404.

However, if it is detected in step 402 that a connected number has in fact been received, the following steps 406-414 are taken in order to determine the capabilities of the connected unit, such that the available multimedia options can be determined and a multimedia session can be conducted, if desired. It should be noted that this procedure can be used regardless of whether the call has been forwarded to a secondary unit B2 or not. That is, the calling terminal needs not detect any call-forwarding state. The capability determination is preferably executed automatically after the call has been set up, but may alternatively be executed in response to some input from the user indicating that capabilities must be determined, such as a multimedia application activation or a multimedia options query.

First in a step 406, terminal A stores the received connected number. The received number may either be that of the called primary unit B1 if no call-forwarding, or that of a secondary unit B2 to which the call has been forwarded, e.g. as obtained in the procedure of steps 308-316 in FIG. 3. In a step 408, it is checked whether the capabilities of the associated unit, either B1 or B2, have been cached in terminal A, using the stored connected number as described above. If so, the cached capabilities are retrieved by using the connected number as a key in a step 410, and if not, a capability exchange procedure is executed based on the stored connected number, in a step 412, e.g. as in the procedure of steps 322-330 in FIG. 3. Thus, the stored connected number is used as the destination address for either a capability query (e.g. SIP OPTIONS) or a session invitation (e.g. SIP INVITE).

After the capabilities of the other communication unit in the call have been determined, i.e. as in any of steps 404, 410 or 412, the available multimedia options can be finally determined in a step 414. Thereafter, the available multimedia options may be displayed to the user on the terminal screen and a multimedia session may be started, as indicated in a final optional step 416.

Finally, it should be noted that the connected number of a secondary communication unit to which an ongoing call is forwarded can be obtained by the calling terminal according to different mechanisms. In one embodiment, the connected number may be automatically provided from the CS core (e.g. 104c) of the secondary unit, e.g. by means of a COLP service or the like. In other embodiments, the connected number may be actually requested either by the calling terminal (e.g. A), by the CS core (e.g. 100c) of the calling terminal, or by the CS core (e.g. 102c) of the originally called terminal. However, in existing systems of today a COLP subscription is in fact necessary to ensure that the calling terminal will obtain a connected number during the call set-up.

While the invention has been described with reference to specific exemplary embodiments, the description is generally only intended to illustrate the inventive concept and should not be taken as limiting the scope of the invention. For example, the described "secondary unit" could be a communication terminal or a voice mail apparatus or the equivalent. The present invention is generally defined by the appended claims.

The invention claimed is:

1. A method of enabling communication of Internet Protocol (IP) multimedia content to a called user, comprising:
    directing a call from a calling terminal to a primary communication unit, wherein the primary communication unit is a communication terminal having a called number associated therewith;
    receiving by the calling terminal a connected number during a call set-up procedure when the call has been forwarded by the primary communication unit to a secondary communication unit, wherein the connected number is associated with the secondary communication unit;
    storing the received connected number; and
    determining multimedia capabilities of the secondary communication unit based on the connected number.

2. The method according to claim 1, further comprising the step of determining available multimedia options based on the determined multimedia capabilities of the secondary communication unit.

3. The method according to claim 1, wherein the connected number is received as the calling terminal subscribes to a connected line presentation (COLP) service.

4. The method according to claim 1, wherein the secondary communication unit is a communication terminal or a voice mail apparatus.

5. The method according to claim 1, wherein the multimedia capabilities of the secondary communication unit are determined by requesting capabilities from the secondary communication unit based on the stored connected number.

6. The method according to claim 5, wherein capabilities are requested from the secondary communication unit by sending a capability query or a session invitation using the stored connected number as a destination address.

7. The method according to claim 1, wherein the multimedia capabilities of the secondary communication unit are determined by retrieving cached capabilities of the secondary unit based on the stored connected number.

8. The method according to claim 7, wherein the cached capabilities are retrieved by using the connected number as a key.

9. A communication terminal capable of Internet Protocol (IP) multimedia communication, comprising:
    means for directing a call from the communication terminal to a primary communication unit, wherein the primary communication unit is a communication terminal having a called number associated therewith;
    means for receiving by the communication terminal a connected number during a call set up procedure when the call has been forwarded to a secondary communication unit, wherein the connected number is associated with the secondary communication unit;
    means for storing the received connected number; and
    means for determining multimedia capabilities of the secondary communication unit based on the connected number.

10. The communication terminal according to claim 9, wherein the terminal is adapted to determine available multimedia options based on the determined multimedia capabilities of the secondary communication unit.

11. The communication terminal according to claim 9, wherein the terminal is adapted to receive the connected number by means of subscription to a connected line presentation (COLP) service.

12. The communication terminal according to claim 9, wherein the terminal is adapted to determine the multimedia capabilities of the secondary communication unit by requesting capabilities from the secondary communication unit based on the stored connected number.

13. The communication terminal according to claim 12, wherein the terminal is further adapted to request capabilities from the secondary communication unit by sending a capability query or a session invitation using the stored connected number as a destination address.

14. The communication terminal according to claim 9, wherein the terminal is adapted to determine the multimedia capabilities of the secondary communication unit by retrieving cached capabilities of the secondary communication unit based on the stored connected number.

15. The communication terminal according to claim 14, wherein the terminal is further adapted to retrieve the cached capabilities by using the connected number as a key.

* * * * *